United States Patent
Liu et al.

(10) Patent No.: US 10,782,206 B2
(45) Date of Patent: Sep. 22, 2020

(54) ENCIRCLED FLUX COMPLIANT TEST APPARATUS

(71) Applicant: AFL TELECOMMUNICATIONS LLC, Duncan, SC (US)

(72) Inventors: Bin Liu, Chestnut Hill, MA (US); Xiujiang Huang, Westford, MA (US); Scott Prescott, Belmont, NH (US)

(73) Assignee: AFL Telecommunications LLC, Duncan, SC (US)

( * ) Notice: Subject to any disclaimer, the term of this patent is extended or adjusted under 35 U.S.C. 154(b) by 127 days.

(21) Appl. No.: 16/065,968

(22) PCT Filed: Dec. 19, 2016

(86) PCT No.: PCT/US2016/067424
§ 371 (c)(1),
(2) Date: Jun. 25, 2018

(87) PCT Pub. No.: WO2017/116781
PCT Pub. Date: Jul. 6, 2017

(65) Prior Publication Data
US 2018/0372582 A1   Dec. 27, 2018

Related U.S. Application Data

(60) Provisional application No. 62/275,938, filed on Jan. 7, 2016, provisional application No. 62/273,652, filed on Dec. 31, 2015.

(51) Int. Cl.
*G01M 11/00* (2006.01)
*G02B 6/42* (2006.01)
(Continued)

(52) U.S. Cl.
CPC .......... *G01M 11/33* (2013.01); *G02B 6/0288* (2013.01); *G02B 6/422* (2013.01); *G02B 6/4225* (2013.01); *G02B 27/10* (2013.01); *G02B 27/30* (2013.01)

(58) Field of Classification Search
CPC .................................................... G01M 11/33
(Continued)

(56) References Cited

U.S. PATENT DOCUMENTS 6,498,876 B1 * 12/2002 Liu ..................... G02B 6/2937
385/24
9,182,550 B1   11/2015 Liu
(Continued)

FOREIGN PATENT DOCUMENTS

CN        201653556 U    11/2010
WO    WO2014/057299 A1    4/2014

OTHER PUBLICATIONS

AFL Telecommunications LLC; International Patent Application No. PCT/US2016/067424; International Search Report; dated Mar. 9, 2017; (3 pages).
(Continued)

*Primary Examiner* — Tarifur R Chowdhury
*Assistant Examiner* — Omar H Nixon
(74) *Attorney, Agent, or Firm* — Dority & Manning, P.A

(57) ABSTRACT

Encircled flux compliant test apparatus are provided. A test apparatus includes an optical connector, and a light source, the light source operable to emit encircled flux compliant light. The test apparatus further includes a first collimator, and a beam splitter optically aligned with the first collimator. The test apparatus further includes a first optical fiber pigtail connected to the light source, and a second optical fiber pigtail connected between the optical connector and the first collimator. A first portion of the light emitted by the light
(Continued)

source is transmitted from the first optical fiber pigtail by the beam splitter and first collimator to the second optical fiber pigtail, and from the second optical fiber pigtail to the optical connector.

20 Claims, 2 Drawing Sheets

(51) Int. Cl.
  *G02B 6/028* (2006.01)
  *G02B 27/10* (2006.01)
  *G02B 27/30* (2006.01)

(58) Field of Classification Search
  USPC ........................................................ 356/73.1
  See application file for complete search history.

(56) References Cited

U.S. PATENT DOCUMENTS

| | | | |
|---|---|---|---|
| 2002/0114565 A1* | 8/2002 | Francis | ................ G02B 6/2937 385/33 |
| 2002/0118920 A1* | 8/2002 | Francis | .............. G02B 6/29362 385/33 |
| 2006/0285800 A1 | 12/2006 | Tatum et al. | |
| 2014/0319354 A1 | 10/2014 | Chen et al. | |
| 2015/0104140 A1* | 4/2015 | Wang | ................ G02B 6/03644 385/124 |
| 2016/0356670 A1* | 12/2016 | Brillhart | ............ G01M 11/3136 |

OTHER PUBLICATIONS

AFL Telecommunications LLC; Canadian Patent Application No. 3,009,942; Canadian Office Action; dated Jun. 27, 2019; (1 page).

* cited by examiner

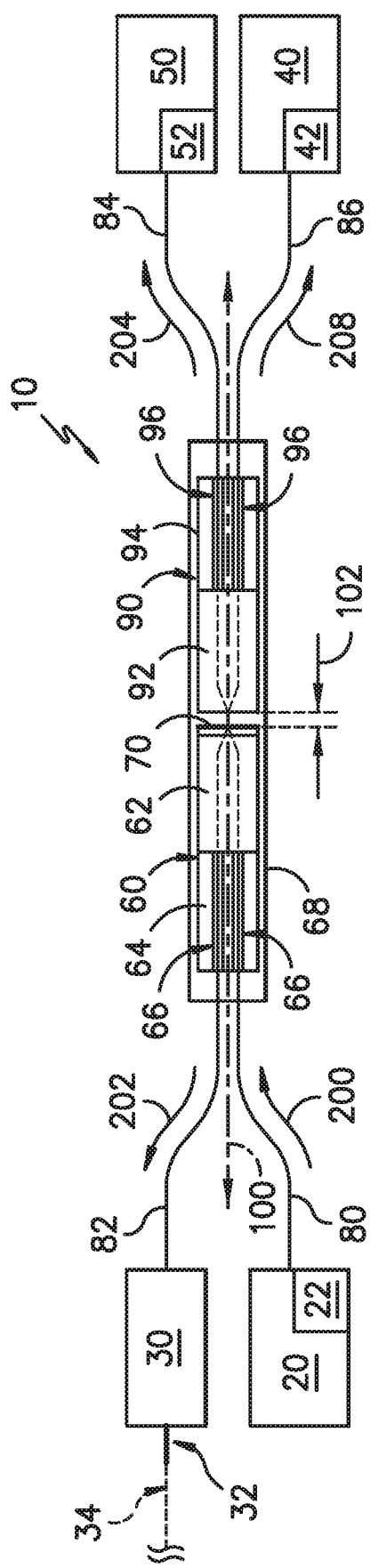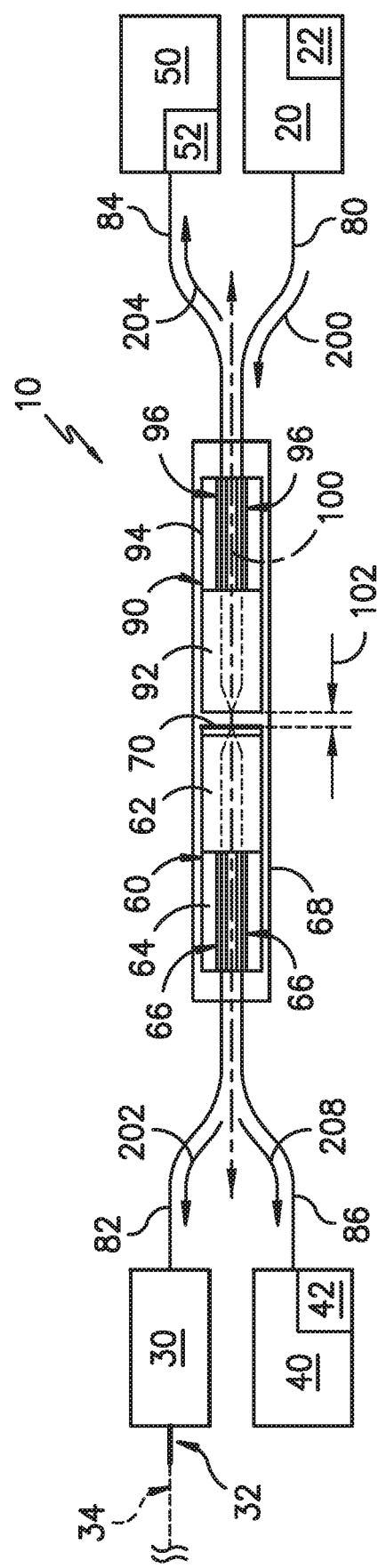

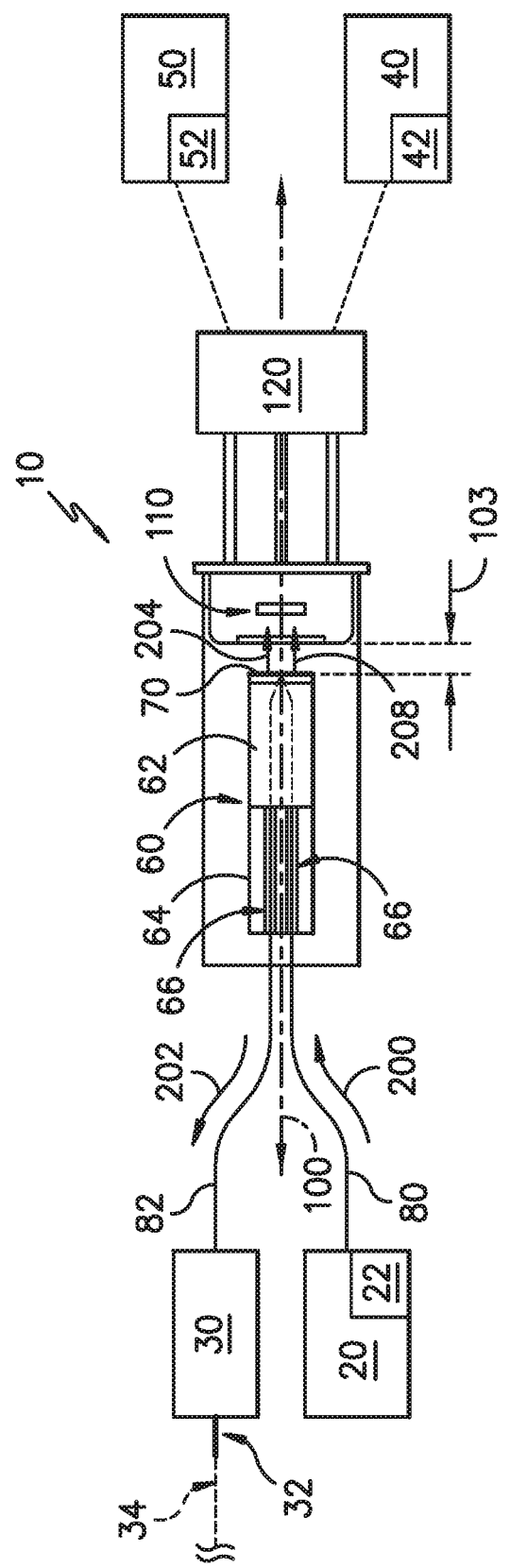
FIG. -3-

ENCIRCLED FLUX COMPLIANT TEST APPARATUS

PRIORITY STATEMENT

This application is a National Stage Patent Application of PCT/US2016/067424, filed on Dec. 19, 2016, which claims the benefit of priority to U.S. Provisional Patent Application No. 62/273,652, filed on Dec. 31, 2015, and to U.S. Provisional Patent Application No. 62/275,938, filed on Jan. 7, 2016, the disclosures of all of which are incorporated by reference herein in their entireties.

FIELD OF THE INVENTION

The present disclosure relates generally to optical fiber test apparatus, and more particularly to encircled flux compliant test apparatus.

BACKGROUND OF THE INVENTION

To ensure accurate measurement of the attenuation/loss of a multimode (MM) optical fiber cable system, use of an encircled flux ("EF") launch condition has been adopted by several international standards, such as in IEC 61280-4-1, entitled "Fibre-optic communication subsystem test procedures—Part 4-1: Installed cable plant—Multimode attenuation measurement" (2009). The EF launch condition has been increasingly put into practice for fiber link loss testing and test equipment manufacturing. An encircled-flux-compliant test requires light from an EF complaint light source being launched and coupled into the fiber under test ("FUT"), and the optical power measurement being unsusceptible to errors introduced by variations of the modal distribution along the optical path to the dedicated power meter.

This requirement imposes a particular challenge to bidirectional link loss testing, where a fiber optic coupler or a similar device is commonly employed to combine and split the optical paths of the light source/transmitter and the power meter/receiver, implemented either internally or externally to the test equipment. Popularly used fiber optic fused couplers are prone to errors caused by modal distribution variations. Their coupling/splitting ratio can be substantially susceptible to this variation, and could negatively affect outer mode distribution. Therefore fused couplers have limited applications in this regard.

Accordingly, improved optical fiber test apparatus are desired in the art. In particular, optical fiber test apparatus that are modal insensitive and can be utilized in EF complaint testing would be advantageous.

BRIEF DESCRIPTION OF THE INVENTION

Aspects and advantages of the invention will be set forth in part in the following description, or may be obvious from the description, or may be learned through practice of the invention.

In accordance with one embodiment, an encircled flux compliant test apparatus is provided. The test apparatus includes an optical connector, and a light source, the light source operable to emit encircled flux compliant light. The test apparatus further includes a first collimator, and a beam splitter optically aligned with the first collimator. The test apparatus further includes a first optical fiber pigtail connected to the light source, and a second optical fiber pigtail connected between the optical connector and the first collimator. A first portion of the light emitted by the light source is transmitted from the first optical fiber pigtail by the beam splitter and first collimator to the second optical fiber pigtail, and from the second optical fiber pigtail to the optical connector.

The test apparatus may further include a power monitor, wherein a second portion of the light emitted by the light source is transmitted from the first optical fiber pigtail to the power monitor.

The test apparatus may further include a power meter, wherein light received by the second optical fiber pigtail from the optical connector is transmitted from the second optical fiber pigtail to the power meter.

In accordance with another embodiment, an encircled flux compliant test apparatus is provided. The test apparatus includes a first collimator and a second collimator, the second collimator spaced apart from the first collimator. The test apparatus further includes a beam splitter optically aligned with the first collimator. The test apparatus further includes a first optical fiber pigtail connected to one of the first collimator or the second collimator, a second fiber pigtail connected to the first collimator, a third optical fiber pigtail connected to the second collimator, and a fourth optical fiber pigtail connected to one of the first collimator or the second collimator. The third optical fiber pigtail and the fourth optical fiber pigtail each have an optical fiber core that is greater than the optical fiber cores of the first optical fiber pigtail and the second optical fiber pigtail.

The test apparatus may further include a light source connected to the first optical fiber pigtail, an optical connector connected to the second optical fiber pigtail, a power monitor connected to the third optical fiber pigtail, and a power meter connected to the fourth optical fiber pigtail.

In accordance with another embodiment, an encircled flux compliant test apparatus is provided. The test apparatus includes a first collimator and a beam splitter optically aligned with the first collimator. The test apparatus further includes a photodetector. The test apparatus further includes a first optical fiber pigtail connected to the first collimator and a second optical fiber pigtail connected to the first collimator. A first portion of light transmitted through the first optical fiber pigtail is transmitted by the first collimator and beam splitter to the second optical fiber pigtail, and a second portion of the light transmitted through the first optical fiber pigtail is transmitted by the first collimator and beam splitter to the photodetector.

The test apparatus may further include a light source connected to the first optical fiber pigtail, an optical connector connected to the second optical fiber pigtail, a power monitor in electronic communication with the photodetector, and a power meter in electronic communication with the photodetector.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates an encircled flux compliant test apparatus in accordance with embodiments of the present disclosure;

FIG. 2 illustrates an encircled flux compliant test apparatus in accordance with alternative embodiments of the present disclosure; and FIG. 3 illustrates an encircled flux compliant test apparatus in accordance with alternative embodiments of the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The present disclosure is generally directed to test apparatus that is EF compliant, i.e. compliant with EF-related test standards. Accordingly, the present test apparatus is generally modal insensitive and thus results in reduced errors caused by modal distribution variations.

Referring now to FIGS. 1 through 3, various embodiments of EF compliant test apparatus 10 in accordance with the present disclosure are provided. The test apparatus 10 may, for example, include a light source 20. The light source 20 may generate light (i.e. infrared light) at one or more suitable predetermined wavelengths for transmission through the other components of the test apparatus 10.

In exemplary embodiments, the light source 20 may be operable to emit EF compliant light. For example, the light source 20 (and test apparatus 10 generally) may include a mode conditioner 22 which is operable to cause the light source 20 to emit light having an EF launch condition in accordance with one or more EF standards.

The test apparatus 10 may further include an optical connector 30. A test jumper 32 may extend from the optical connector 30. An optical fiber 34 to be tested (i.e. a fiber under test) may be connected to the optical connector 30, i.e. via the jumper 32. In exemplary embodiments, the jumper 32 may be a reference grade jumper 32. The optical connector 30 may in exemplary embodiments be a universal connector interface or an FC connector (i.e. ferrule connector). Suitable FC connectors may include, for example, FC/UPC and FC/APC connectors. Alternatively, however, other suitable optical connectors 30 may be utilized.

A test apparatus 10 may further include, for example, a power meter 40. The power meter 40 is generally an optical power meter which is operable to detect and measure the power of light at one or more predetermined wavelengths or ranges of wavelengths. The detected and measured light is, in exemplary embodiments, light on the infrared wavelength spectrum. Common wavelengths (i.e. those utilized in multimode optical fibers) include 850 nanometers and/or 1300 nanometers. In general, a power meter 40 may be or include a measurement circuit or photodetector 42. The measurement circuit 42 may generally convert a received signal for measurement and/or display purposes. For example, the measurement circuit 42 may convert a received optical signal into an electrical signal. The electrical signal may further be sent to an analog to digital converter. The resulting electrical signal may be displayed as a power meter 40 output.

A test apparatus 10 may further include, for example, a power monitor 50. The power monitor 50 may generally monitor the power of transmitted light. Further, the power monitor 50 may be in communication with the light source 20, and may act as part of a closed-loop feedback mechanism for adjustment of the power of the light emitted by the light source 20. More specifically, the power of the light being emitted by the light source 20 may be adjusted based on power feedback signals from the power monitor 50. These signals may in turn be based on the power of light received by the power monitor 50.

The power monitor 50 may, for example, include a controller 52. The controller 22 may include memory and one or more processing devices such as microprocessors, CPUs or the like, such as general or special purpose microprocessors operable to execute programming instructions or micro-control code associated with operation of power monitor 50 and/or test apparatus 10 generally (including operation of the closed-loop feedback mechanism). The memory can represent random access memory such as DRAM, or read only memory such as ROM or FLASH. The processor executes programming instructions stored in the memory. The memory can be a separate component from the processor or can be included onboard within the processor. Alternatively, the controller 52 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

A test apparatus 10 may further include, for example, a first collimator 60. The collimator 60 generally collimates, or narrows and aligns, light being transmitted therethrough. For example, in exemplary embodiments as shown, the collimator includes a lens 62. The lens may, in some embodiments, be a graded-index lens. Alternatively, other suitable glass lenses or lenses formed from other suitable materials may be utilized. Collimator 60 may, in some embodiments, further include a ferrule 64. The ferrule 64 may be connected to and/or otherwise optically aligned with an end of the lens 62, as shown. In exemplary embodiments, the ferrule 64 may be a dual fiber ferrule, and thus define two parallel channels 66 extending therethrough. Each channel 66 may accommodate an optical fiber therein for connection to the collimator 60, as discussed herein. Alternatively, the ferrule 64 may include one, three or more channels 66.

In some embodiments, a protective sleeve 68 may additionally be provided, and the collimator 60 may be housed in the protective sleeve 68. The sleeve 68 may further align the collimator 60 with other components of the test apparatus 10 as discussed herein.

A beam splitter 70 may be optically aligned with, and in some embodiments connected to, the first collimator 60. For example, the beam splitter 70 may be in contact with and connected to an end of the collimator 60. The beam splitter 70 may be optically aligned with an end of the lens 62 opposite the end to which the ferrule 64 is connected. In embodiments wherein a protective sleeve 68 is utilized, the beam splitter 70 may be housed within the protective sleeve 68. Any suitable beam splitter 70 may be utilized. For example, in some embodiments, the beam splitter 70 may be a glass, an optical film coating, or a cubic. As is generally understood, the beam splitter 70 may transmit a portion of light received by the beam splitter 70 therethrough, and may reflect another portion of the received light. In exemplary embodiments, the beam splitter 70 may reflect 50% of the light and transmit 50% of the light. Alternatively, the beam splitter 70 may reflect between 40% and 60% of the light and transmit between 60% and 40% of the light, such as reflect between 45% and 55% of the light and transmit between 55% and 45% of the light. In other alternatively embodiments, any suitable relative percentages of transmitted and reflected light may be utilized.

Test apparatus 10 may further include various components for facilitating the transmission of light from the light source 20 to the optical connector 30 and to the power monitor 50, and to further facilitate the transmission of light from the optical connector to the power meter 40. These light transmissions may be provided through the first collimator 60 and via the beam splitter 70 as discussed herein.

For example, test apparatus 10 may include a first optical fiber pigtail 80. The first optical fiber pigtail 80 may be connected, such as at a first end thereof, to the light source 20. Test apparatus 10 may further include a second optical fiber pigtail 82. The second optical fiber pigtail 82 may be connected, such as at a first end thereof, to the optical connector 30. In exemplary embodiments, the first optical fiber pigtail 80 and second optical fiber pigtail 82 are multi-mode optical fibers. Further, in exemplary embodiments, each optical fiber pigtail 80, 82 may have a standard optical fiber core diameter and outer cladding diameter, i.e. 50 micrometers and 125 micrometers respectively.

As discussed, light 200 (which may be EF compliant light as discussed) may be emitted by the light source 20. A first portion 202 of this light 200 may be transmitted from the light source 20 to and through the first optical fiber pigtail 80. This light 202 may further be transmitted from the first optical fiber pigtail 80 by the beam splitter 70 and first collimator 60 to the second optical fiber pigtail 82. The light 202 may further be transmitted through the second optical fiber pigtail 82 to the optical connector 30. The light 202 may then be transmitted from the optical connector 30 (in exemplary embodiments through the jumper 32) thereof to the fiber under test 34 for testing purposes. A second portion 204 of the light 200 may be transmitted from the light source 20 to and through the first optical fiber pigtail 80 (i.e. with the first portion 202 as light 200 generally). This light 204 may further be transmitted from the first optical fiber pigtail 80 by the beam splitter 70 and first collimator 60 to the power monitor 50, as discussed herein. The light 202 may, for example, be between 60% and 40% of the light 200, such as between 55% and 45% of the light 200, such as 50% of the light 200. The light 204 may, for example, be between 40% and 60% of the light 200, such as between 45% and 55% of the light 200, such as 50% of the light 200.

A light 208 from the fiber under test 34 (i.e. from a light source connected to a distal end thereof or reflected light 202) may be received by the optical connector 30 (in exemplary embodiments through the jumper 32). This light 208 may be transmitted from the optical connector 30 to and through the second optical fiber pigtail 82. The light 208 (i.e. a portion thereof) may further be transmitted from the second optical fiber pigtail 82 by the first collimator 60 and the beam splitter 70 to the power meter 40.

In exemplary embodiments as shown, the second optical fiber pigtail 82 may be connected, such as at the second opposite end thereof, to the first collimator 60. For example, the second optical fiber pigtail 82 may extend through a channel 66 of the ferrule 64 and be connected to the lens 62. Accordingly, the second optical fiber pigtail 82 may be connected to and between the optical connector 30 and the first collimator 60. Such connections may facilitate the various light transmissions therethrough as discussed herein.

Referring now to FIGS. 1 and 2, in some embodiments, test apparatus 10 includes a second collimator 90. The collimator 90 generally collimates, or narrows and aligns, light being transmitted therethrough. The second collimator 90 may further facilitate the various transmissions of light as discussed herein. For example, in exemplary embodiments as shown, the collimator includes a lens 92. The lens may, in some embodiments, be a graded-index lens. Alternatively, other suitable glass lenses or lenses formed from other suitable materials may be utilized. Collimator 90 may, in some embodiments, further include a ferrule 94. The ferrule 94 may be connected to and/or otherwise optically aligned with an end of the lens 92, as shown. In exemplary embodiments, the ferrule 94 may be a dual fiber ferrule, and thus define two parallel channels 96 extending therethrough. Each channel 96 may accommodate an optical fiber therein for connection to the collimator 90, as discussed herein. Alternatively, the ferrule 94 may include one, three or more channels 96.

In embodiments wherein a protective sleeve 68 is utilized, the second collimator 90 may be housed in the protective sleeve 68.

As illustrated, the collimator 90 may be spaced from the first collimator 60 and beam splitter 70, such as along a longitudinal axis 100. Accordingly, a longitudinal gap 102 may be defined between beam splitter 70 and collimator 90. The collimater 90 may further be optically aligned with the beam splitter 70. Light travelling from the first collimator 60 to the second collimator 90 or vice versa may be transmitted across this gap 102. The gap 102 may be determined to obtain a desired light transmission efficiency. In exemplary embodiments, the gap may be less than or equal to 20 millimeters, such as less than or equal to 15 millimeters, such as between 3 millimeters and 20 millimeters, such as between 4 millimeters and 15 millimeters, such as between 5 millimeters and 10 millimeters. The second collimator 90 may further have an opposite orientation along the longitudinal axis 100 to the first collimator, such that the lens 62, 92 are proximate each other relative to the ferrules 64, 94.

In these embodiments, test apparatus 10 may further include a third optical fiber pigtail 84. The third optical fiber pigtail 84 may be connected, such as at a first end thereof, to the power monitor 50. Test apparatus 10 may further include a fourth optical fiber pigtail 86. The fourth optical fiber pigtail 86 may be connected, such as at a first end thereof, to the power meter 40. In exemplary embodiments, the third optical fiber pigtail 84 and fourth optical fiber pigtail 86 are multi-mode optical fibers. Further, in exemplary embodiments, each optical fiber pigtail 84, 86 may have an optical fiber core that is greater, i.e. greater in cross-sectional diameter, than the cores of the first and second optical fiber pigtails. For example, each optical fiber pigtail 84, 86 may have an optical fiber core and outer cladding diameter that are 62.5 micrometers and 125 micrometers respectively. Advantageously, such larger cores capture a significant amount of light therein with reduced perturbation by modal variations along the optical paths.

In these embodiments, the third optical fiber pigtail 84 may be connected, such as at a second end, to the second collimator 90. For example, the third optical fiber pigtail 84 may extend through a channel 96 of the ferrule 94 and be connected to the lens 92. Accordingly, the third optical fiber pigtail 84 may be connected to and between the power monitor 50 and the second collimator 90. Such connections may facilitate the various light transmissions therethrough as discussed herein.

The first and fourth optical fiber pigtails 80, 86 may each be connected to either the first collimator 60 or the second collimator 90. More specifically, one of the first and fourth optical fiber pigtail 80, 86 may be connected to the first collimator 60, and the other of the first and fourth optical fiber pigtail 80, 86 may be connected to the second collimator 90. In some embodiments, as illustrated in FIG. 1, the first optical fiber pigtail 80 may be connected, i.e. at a second end thereof, to the first collimator 60 and the fourth optical fiber pigtail 86 may be connected, i.e. at a second end thereof, to the second collimator 90. For example, the first optical fiber pigtail 80 may extend through a channel 66 of the ferrule 64 and be connected to the lens 62, and the fourth optical fiber pigtail 86 may extend through a channel 96 of the ferrule 94 and be connected to the lens 92. Accordingly, the first optical fiber pigtail 80 may be connected to and between the light source 20 and the first collimator 60, and the fourth optical fiber pigtail 86 may be connected to and between the power meter 40 and the second collimator 90. Alternatively, as illustrated in FIG. 2, the first optical fiber pigtail 80 may be connected, i.e. at a second end thereof, to the second collimator 90 and the fourth optical fiber pigtail 86 may be connected, i.e. at a second end thereof, to the first collimator 60. For example, the first optical fiber pigtail 80 may extend through a channel 96 of the ferrule 94 and be connected to the lens 92, and the fourth optical fiber pigtail 86 may extend through a channel 66 of the ferrule 64 and be connected to the lens 62. Accordingly, the first optical fiber pigtail 80 may be connected to and between the light source 20 and the second collimator 90, and the fourth optical fiber pigtail 86 may be connected to and between the power meter 40 and the first collimator 60.

In some embodiments, as illustrated in FIG. 1, light 200 is generated by the light source 20 and transmitted through the first optical fiber pigtail 80 as discussed. This light 200 is further transmitted from the first optical fiber pigtail 80 to and through the first collimator 60, and from the first collimator 60 to the beam splitter 70. As discussed, a portion 202 of the light 200 may be reflected by the beam splitter 70 to the second optical fiber pigtail 82, and through the second optical fiber pigtail 82 to the optical connector 30 as discussed. Further, a portion 204 of the light 200 may be transmitted through the beam splitter 70 to the second collimator 90, and from the second collimator 90 to the third optical fiber pigtail 84. This light 204 is further transmitted through the third optical fiber pigtail 84 to the power monitor 50. Light 208 transmitted to the optical connector 30 (in exemplary embodiments through the jumper 32) may be transmitted from the optical connector 30 to and through the second optical fiber pigtail 82, and from the second optical fiber pigtail 82 to and through the first collimator 60. The light 208 (or a portion thereof) may further be transmitted from the first collimator 60 to and through the beam splitter 70 to the second collimator 90. The light 208 may then be transmitted from the second collimator 90 to and through the fourth optical fiber pigtail 84, and from the fourth optical fiber pigtail 84 to the power meter 40.

In other embodiments, as illustrated in FIG. 2, light 200 is generated by the light source 20 and transmitted through the first optical fiber pigtail 80 as discussed. This light 200 is further transmitted from the first optical fiber pigtail 80 to and through the second collimator 90, and from the second collimator 90 to the beam splitter 70. As discussed, a portion 202 of the light 200 may be transmitted through the beam splitter 70 to the second optical fiber pigtail 82 (such as via the first collimator 60), and through the second optical fiber pigtail 82 to the optical connector 30 as discussed. Further, a portion 204 of the light 200 may be reflected by the beam splitter 70 to the second collimator 90, and from the second collimator 90 to the third optical fiber pigtail 84. This light 204 is further transmitted through the third optical fiber pigtail 84 to the power monitor 50. Light 208 transmitted to the optical connector 30 (in exemplary embodiments through the jumper 32) may be transmitted from the optical connector 30 to and through the second optical fiber pigtail 82, and from the second optical fiber pigtail 82 to and through the first collimator 60. The light 208 (or a portion thereof) may further be transmitted from the first collimator 60 to the beam splitter 70 and reflected by the beam splitter 70. The light 208 may then be transmitted from the first collimator 60 to and through the fourth optical fiber pigtail 86, and from the fourth optical fiber pigtail 86 to the power meter 40.

Referring now to FIG. 3, in other embodiments, test apparatus 10 may further include a photodetector 110. In exemplary embodiments, the photodetector 110 may be a photodiode. The photodetector may or may not include a flat or lensed window.

In embodiments wherein a protective sleeve 68 is utilized, the photodetector 110 may be housed in the protective sleeve 68.

As illustrated, the photodetector 110 may be spaced from the first collimator 60 and beam splitter 70, such as along a longitudinal axis 100. Accordingly, a longitudinal gap 103 may be defined between beam splitter 70 and photodetector 110. Light travelling from the first collimator 60 to the photodetector 110 may be transmitted across this gap 103. The gap 103 may be determined to obtain a desired responsivity. In exemplary embodiments, the gap may be less than or equal to 20 millimeters, such as less than or equal to 15 millimeters, such as between 3 millimeters and 20 millimeters, such as between 4 millimeters and 15 millimeters, such as between 5 millimeters and 10 millimeters.

The photodetector 110 may be in electronic communication, i.e. via a switch 120 as discussed herein and suitable wired or wireless connections, with the power monitor 50 and power meter 40. Further, in these embodiments, the first optical fiber pigtail 80 may be connected, i.e. at a second end thereof, to the first collimator 60. For example, the first optical fiber pigtail 80 may extend through a channel 66 of the ferrule 64 and be connected to the lens 62. Accordingly, the first optical fiber pigtail 80 may be connected to and between the light source 20 and the first collimator 60.

In these embodiments, light 200 is generated by the light source 20 and transmitted through the first optical fiber pigtail 80 as discussed. This light 200 is further transmitted from the first optical fiber pigtail 80 to and through the first collimator 60, and from the first collimator 60 to the beam splitter 70. As discussed, a portion 202 of the light 200 may be reflected by the beam splitter 70 to the second optical fiber pigtail 82, and through the second optical fiber pigtail 82 to the optical connector 30 as discussed. Further, a portion 204 of the light 200 may be transmitted through the beam splitter 70 to the photodetector 110. This light 204 may be converted by the photodetector to an electrical signal, and the signal may be transmitted from the photodetector to the power monitor 50. Light 208 transmitted to the optical connector 30 (in exemplary embodiments through the jumper 32) may be transmitted from the optical connector 30 to and through the second optical fiber pigtail 82, and from the second optical fiber pigtail 82 to and through the first collimator 60. The light 208 (or a portion thereof) may further be transmitted from the first collimator 60 to and through the beam splitter 70 to the photodetector 110. This light 208 may be converted by the photodetector to an electrical signal, and the signal may be transmitted from the photodetector to the power meter 40.

In exemplary embodiments, a switch 120 (i.e. an electronic or relay switch) may be provided between and in communication with the photodetector 110 and the power monitor 50 and power meter 40. The switch 120 may route the electrical signal (i.e. the current) to the power monitor 50 or to the power meter 40 as necessary. For example, when the photodetector 110 is being utilized as part of a light source control loop, the switch 120 may connect the photodetector 110 to the power monitor 50. When the photodetector 110 is being utilized to detect and measure the power of the light, the switch 120 may connect the photodetector 110 to the power meter 40.

Test apparatus 10 in accordance with the present disclosure may advantageously facilitate EF compliant optical fiber testing with high accuracy and modal insensitive power measurements. Additionally, test apparatus 10 in accordance with the present disclosure may advantageously have relatively non-complex optical structures which alleviate complexities in manufacturing and improved detectability while being modal insensitive.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An encircled flux compliant test apparatus, comprising:
   an optical connector;
   a light source, the light source operable to emit encircled flux compliant light;
   a first collimator;
   a second collimator, the second collimator spaced from the first collimator;
   a beam splitter optically aligned with the first collimator;
   a first optical fiber pigtail connected to the light source;
   a second optical fiber pigtail connected between the optical connector and the first collimator;
   a third optical fiber pigtail connected to the second collimator; and
   a fourth optical fiber pigtail connected to the second collimator;
   wherein a first portion of the light emitted by the light source is transmitted from the first optical fiber pigtail by the beam splitter and first collimator to the second optical fiber pigtail, and from the second optical fiber pigtail to the optical connector, and
   wherein the third optical fiber pigtail and the fourth optical fiber pigtail each have an optical fiber core that is greater than the optical fiber cores of the first optical fiber pigtail and the second optical fiber pigtail.

2. The test apparatus of claim 1, wherein the first collimator comprises a lens and a dual fiber ferrule.

3. The test apparatus of claim 2, wherein the lens is a graded-index lens.

4. The test apparatus of claim 1, further comprising a power monitor, wherein a second portion of the light emitted by the light source is transmitted from the first optical fiber pigtail to the power monitor.

5. The test apparatus of claim 1, further comprising a power meter, wherein light received by the second optical fiber pigtail from the optical connector is transmitted from the second optical fiber pigtail to the power meter.

6. The test apparatus of claim 1, wherein the first optical fiber pigtail is connected between the light source and the first collimator.

7. The test apparatus of claim 1, further comprising:
   a power monitor, wherein the third optical fiber pigtail is connected between the second collimator and the power monitor; and
   a power meter, wherein the fourth optical fiber pigtail is connected between the second collimator and the power meter.

8. An encircled flux compliant test apparatus, comprising:
   a first collimator;
   a second collimator, the second collimator spaced apart from the first collimator;
   a beam splitter optically aligned with the first collimator;
   a first optical fiber pigtail connected to one of the first collimator or the second collimator;
   a second fiber pigtail connected to the first collimator;
   a third optical fiber pigtail connected to the second collimator; and
   a fourth optical fiber pigtail connected to one of the first collimator or the second collimator,
   wherein the third optical fiber pigtail and the fourth optical fiber pigtail each have an optical fiber core that is greater than the optical fiber cores of the first optical fiber pigtail and the second optical fiber pigtail.

9. The test apparatus of claim 8, wherein the first optical fiber pigtail is connected to the first collimator and the fourth optical fiber pigtail is connected to the second collimator.

10. The test apparatus of claim 8, wherein the fourth optical fiber pigtail is connected to the first collimator and the first optical fiber pigtail is connected to the second collimator.

11. The test apparatus of claim 8, further comprising a light source connected to the first optical fiber pigtail, an optical connector connected to the second optical fiber pigtail, a power monitor connected to the third optical fiber pigtail, and a power meter connected to the fourth optical fiber pigtail.

12. The test apparatus of claim 11, wherein the light source is operable to emit encircled flux compliant light.

13. The test apparatus of claim 8, wherein the first collimator and second collimator each comprises a lens and a dual fiber ferrule.

14. An encircled flux compliant test apparatus, comprising:
   an optical connector;
   a light source, the light source operable to emit encircled flux compliant light;
   a first collimator;
   a second collimator, the second collimator spaced from the first collimator;
   a beam splitter optically aligned with the first collimator;
   a first optical fiber pigtail connected to the light source;
   a second optical fiber pigtail connected between the optical connector and the first collimator;
   a third optical fiber pigtail connected to the second collimator; and a fourth optical fiber pigtail connected to the first collimator;

wherein a first portion of the light emitted by the light source is transmitted from the first optical fiber pigtail by the beam splitter and first collimator to the second optical fiber pigtail, and from the second optical fiber pigtail to the optical connector, and wherein the third optical fiber pigtail and the fourth optical fiber pigtail each have an optical fiber core that is greater than the optical fiber cores of the first optical fiber pigtail and the second optical fiber pigtail.

15. The test apparatus of claim 14, wherein the first collimator comprises a lens and a dual fiber ferrule.

16. The test apparatus of claim 15, wherein the lens is a graded-index lens.

17. The test apparatus of claim 14, further comprising a power monitor, wherein a second portion of the light emitted by the light source is transmitted from the first optical fiber pigtail to the power monitor.

18. The test apparatus of claim 14, further comprising a power meter, wherein light received by the second optical fiber pigtail from the optical connector is transmitted from the second optical fiber pigtail to the power meter.

19. The test apparatus of claim 14, wherein the first optical fiber pigtail is connected between the light source and the second collimator.

20. The test apparatus of claim 14, further comprising:
a power monitor, wherein the third optical fiber pigtail is connected between the second collimator and the power monitor; and
a power meter, wherein the fourth optical fiber pigtail is connected between the first collimator and the power meter.

* * * * *